(12) United States Patent
Mohaisen (10) Patent No.: US 9,578,125 B2
(45) Date of Patent: Feb. 21, 2017

(54) SYSTEMS, DEVICES, AND METHODS FOR PROTECTING ACCESS PRIVACY OF CACHED CONTENT

(71) Applicant: VERISIGN, INC., Reston, VA (US)

(72) Inventor: Abedelaziz Mohaisen, Chantilly, VA (US)

(73) Assignee: Verisign, Inc., Reston, VA (US)

( * ) Notice: Subject to any disclaimer, the term of this patent is extended or adjusted under 35 U.S.C. 154(b) by 295 days.

(21) Appl. No.: 14/269,484

(22) Filed: May 5, 2014

(65) Prior Publication Data

US 2014/0337460 A1 Nov. 13, 2014

Related U.S. Application Data

(60) Provisional application No. 61/820,372, filed on May 7, 2013.

(51) Int. Cl.
*G06F 12/00* (2006.01)
*G06F 13/00* (2006.01)
(Continued)

(52) U.S. Cl.
CPC ......... *H04L 67/2842* (2013.01); *G06F 21/554* (2013.01); *G06F 21/556* (2013.01);
(Continued)

(58) Field of Classification Search
CPC .............. H04L 63/1458; H04L 61/1511; H04L 63/1441; H04L 63/1416; H04L 63/1466; H04L 29/12066; H04L 63/1408; H04L 67/02; H04L 63/1433; H04L 63/08; H04L 63/126; H04L 63/0823; H04L 63/1425; H04L 67/28; G06F 12/1408; G06F 12/0802; G06F 21/552; G06F 21/556; G06F 21/554; G06F 21/79; G06F 12/0866; G06F 21/602; G06F 21/00; G06F 12/0804; G06F 21/577; G06F 2212/1052; G06F 12/0842; G06F 12/0862; H04W 80/04; H04W 12/06; H04W 12/12; H04W 8/082; H04W 8/26; H04W 12/02; H04W 4/18
(Continued)

(56) References Cited

U.S. PATENT DOCUMENTS 6,601,098 B1 * 7/2003 Case ................... H04L 12/2697
370/253
6,807,483 B1 * 10/2004 Chao ..................... G01C 21/00
340/995.12
(Continued)

OTHER PUBLICATIONS

Edward W. Felten et al. ("Timing Attacks on Web Privacy", Aug. 25, 2000, Department of Computer Science Princeton University).*
(Continued)

*Primary Examiner* — Thomas Dailey
*Assistant Examiner* — Abderrahmen Chouat
(74) *Attorney, Agent, or Firm* — Artegis Law Group, LLP (57) ABSTRACT

Embodiments relate to systems, devices, and computer-implemented methods for preventing determination of previous access of sensitive content by receiving, from a user, a request for content at a device in an information centric network, where a cached version of the content is locally stored at the device; initiating a time delay based on a determination that the user has not previously requested the content; and transmitting the cached version of the content to the user after the time delay.

20 Claims, 7 Drawing Sheets

(51) Int. Cl.
  G06F 21/60   (2013.01)
  H04L 29/08   (2006.01)
  G06F 21/55   (2013.01)
  H04L 9/00    (2006.01)
  H04L 29/06   (2006.01)

(52) U.S. Cl.
  CPC .............. *G06F 21/60* (2013.01); *H04L 9/005* (2013.01); *H04L 63/10* (2013.01); *H04L 67/32* (2013.01); *G06F 2212/1052* (2013.01); *H04L 2463/121* (2013.01)

(58) Field of Classification Search
  USPC .......... 726/22, 23, 26, 25, 24; 709/223, 217, 709/203, 225, 226, 229, 227, 245; 713/189, 713/190, 193, 168, 176, 150, 188
  See application file for complete search history.

(56)  References Cited

U.S. PATENT DOCUMENTS

| | | | |
|---|---|---|---|
| 7,363,361 | B2 | 4/2008 | Tewari et al. |
| 7,765,275 | B2 | 7/2010 | Crick et al. |
| 8,484,314 | B2 | 7/2013 | Luna et al. |
| 8,490,165 | B2 | 7/2013 | Wray |
| 8,504,827 | B1 | 8/2013 | Sizer et al. |
| 8,516,201 | B2 | 8/2013 | Raikin et al. |
| 8,533,293 | B1 | 9/2013 | Sivasubramanian et al. |
| 8,601,259 | B2 | 12/2013 | Resch |
| 9,094,090 | B2 * | 7/2015 | Markovitz ......... H04B 7/18517 711/115 |
| 2012/0042130 | A1 | 2/2012 | Peapell |
| 2012/0259969 | A1 * | 10/2012 | Mastrangelo ....... G06F 11/3419 709/224 |
| 2013/0268760 | A1 | 10/2013 | Bono et al. |
| 2013/0290733 | A1 | 10/2013 | Branton et al. |

OTHER PUBLICATIONS

Ioannis Psaras "Probabilistic In-Network Caching for Information-Centric Networks" Aug. 17, 2012 ACM "ICN '12 Proceedings of the second edition of the ICN workshop on Information-centric networking".*
Kamran Sheikh et al., "Quality-of-Context and its use for Protecting Privacy in Context Aware Systems", Journal of Software, vol. 3, No. 3, Mar. 2008, pp. 83-93.
Abedelaziz Mohaisen et al., "Poster: Protecting Access Privacy of Cached Contents in Information Centric Networks", CCS '12 Proceedings of the 2012 ACM Conference on Computer and Communications Security, Oct. 2012, pp. 1001-1003.
Bernard Sager (Examiner), Extended European Search Report dated Aug. 19, 2014, European Application No. 14167359.0, filed May 7, 2014, pp. 1-8.
Gergely Acs et al., "Cache privacy in named-data networking", IEEE ICDCS, Jul. 2013, pp. 1-11.
Bengt Ahlgren et al., "A survey of information-centric networking", IEEE Comm Mag., 2012, pp. 1-26.
Alexa, "Top 500 Sites", http//:www.alexa.com/topsites, Jul. 2012, pp. 1-11.
Ashok Anand et al., "XIA: An Architecture for an Evolvable and Trustworthy Internet", Proceedings of the 10th ACM Workshop on Hot Topics, Nov. 2011, pp. 1-6.
David G. Andersen et al., "Accountable Internet Protocol (AIP)", Proceedings of SIGCOMM '08, Aug. 2008, pp. 1-12.
Tom Anderson et al., "NEBULA—A Future Internet That Supports Trustworthy Cloud Computing", White Paper, 2010, pp. 1-31.
Somaya Arianfar et al., "On Preserving Privacy in Contented-Oriented Networks", Proceedings of the ACM SIGCOMM ICN, Aug. 2011, pp. 19-24.

Hari Balakrishnan et al., "A Layered Naming Architecture for the Internet", Proceedings of ACM SIGCOMM, 2004, pp. 343-352.
Matthew Caesar et al., "RAFL: Routing on Flat Labels", Proceedings of ACM SIGCOMM, Sep. 2006, pp. 1-12.
Yaogong Wang et al., "Advertising Cached Contents in the Control Plane: Necessity and Feasibility", Proceedings of IEEE INFOCOM Workshops, 2012, pp. 286-291.
Wei Koong Chai et al., "Cache 'Less for More' in Information-centric Networks", Networking 2012, 2012, pp. 27-40.
Kideok Cho et al., "Wave: Popularity-based and collaborative in-network caching for content-oriented networks", Proceedings of IEEE INFOCOM Workshops, 2012, pp. 316-321.
A. Detti et al., "CONET: A Content Centric Inter-Networking Architecture", Proceedings of ACM SIGCOMM Inc '11, Aug. 2011, pp. 50-55.
Ali Ghodsi et al., "Naming in Content-Oriented Architectures", Proceedings of SIGCOMM ICN '11, Aug. 2011, pp. 1-6.
Ali Ghodsi et al., "Information-Centric Networking: Seeing the Forest for the Trees", Proceedings of ACM Hotnets '11, Nov. 2011, pp. 1-6.
Ali Ghodsi et al., "Intelligent Design Enables Architectural Evolution", Proceedings of ACM Hotnets '11, Nov. 2011, pp. 1-6.
Mark Gritter et al., "An Architecture for Content Routing Support in the Internet", USITS'01 Proceedings of the 3rd conference on USENIX Symposium on Internet Technologies and Systems—vol. 3, 2001, pp. 37-48.
Dongsu Han et al., "XIA: Efficient Support for Evolvable Internetworking", Proceedings of USENIX NSDI, 2012, pp. 1-14.
Van Jacobson et al., "Networking Named Content", Proceedings of ACM CoNEXT '09, Dec. 2009, pp. 1-12.
Jongmin Jeong et al., "Host-Oblivious Security for Content-Based Networks", Proceedings of ACM CFI '10, Jun. 2010, pp. 35-40.
Konstantinos Katsaros et al., "A hybrid overlay multicast and caching scheme for information-centric networking", Proceedings of 13th Annual IEEE Global Internet Symposium, Mar. 2010, pp. 1-17.
Diko Ko et al., "Decentralized and Autonomous Content Overlay Networking (DACON) with WiFi Access Points", Proceedings of ACM CFI '10, Jun. 2010, pp. 18-24.
Teemu Koponen et al., "A Data-Oriented (and Beyond) Network Architecture", Proceedings of SIGCOMM '07, Aug. 2007, pp. 1-12.
Tobias Lauinger et al., "Privacy Risks in Named Data Networking: What is the Cost of Performance?", Computer Communication Review, vol. 42, No. 5, 2012, pp. 54-57.
Abedelaziz Mohaisen et al., "Protecting Access Privacy of Cached Contents in Information Centric Networks", Proceedings of ACM ASIA CCS '13, May 2013, pp. 1-6.
Thomas Ristenpart et al., "Hey, You, Get Off of My Cloud: Exploring Information Leakage in Third-Party Compute Clouds", Proceedings of ACM CCS '09, Nov. 2009, pp. 199-212.
Stefano Salsano et al., "Transport-Layer Issues in Information Centric Networks" Proceedings of ACM SIGCOMM ICN '12, Aug. 2012, pp. 19-24.
Ivan Seskar et al., "MobilityFirst Future Internet Architecture Project", Proceedings ACM AINTec, 2011, pp. 1-5.
Sapna Singh et al., "A Trust Based Approach for Secure Access Control in Information Centric Network", International Journal of Information & Network Security, vol. 1, No. 2, Jun. 2012, pp. 97-104.
CCNx, Project CCNx, https://www.ccnx.org/, Jul. 2012, pp. 1-4.
Traceroute, Traceroute, http://traceroute.org/, Jul. 2012, pp. 1-31.
Dirk Trossen et al., "Arguments for an Information-Centric Internetworking Architecture", ACM SIGCOMM Computer Communication Review, vol. 40, No. 2, Apr. 2010, pp. 27-33.
Gareth Tyson et al., "A Survey of Mobility in Information-Centric Networks: Challenges and Research Directions", Proceedings of ACM NoM '12, Jun. 2012, pp. 1-6.
Matthias Wahlisch et al., "Backscatter from the Data Plane—Threats to Stability and Security in Information-Centric Networking", Computer Networks, vol. 57, Issue 16, Nov. 2013, pp. 3192-3206.
Walter Wong et al., "Secure Naming in Information-centric Networks", Proceedings of ACM ReArch 2010, Nov. 2010, pp. 1-6.

(56) References Cited

OTHER PUBLICATIONS

Lixia Zhang et al., "Named Data Networking (NDN) Project", Technical Report NDN-0001, http://named-data.net/techreports.html, Oct. 2010, pp. 1-26.

Xinwen Zhang et al., "Towards Name-based Trust and Security for Content-centric Network" Proceedings of the IEEE ICNP, 2011, pp. 1-17.

Xin Zhang et al., "SCION: Scalability, Control, and Isolation on Next-Generation Networks", Proceedings of IEEE S&P, 2011, pp. 1-16.

* cited by examiner

SYSTEMS, DEVICES, AND METHODS FOR PROTECTING ACCESS PRIVACY OF CACHED CONTENT

CROSS-REFERENCE TO RELATED APPLICATIONS

This application claims priority to U.S. Provisional Patent Application No. 61/820,372, titled "SYSTEMS, DEVICES, AND METHODS FOR PROTECTING ACCESS PRIVACY OF CACHED CONTENT", filed on May 7, 2013, hereby incorporated by reference.

The present disclosure relates to systems, devices, and methods for protecting access privacy of cached content in information centric networks.

BACKGROUND

Information Centric Networks (hereinafter, "ICN") have been proposed as an alternative approach to a computer network architecture. ICNs are designed around the principle that a user should be allowed to focus on the content to be retrieved, not on the physical location of the content.

An ICN can allow for the retrieval of content from content servers based on the name of the content. For example, a request for content can be passed up a chain of routers until the request is received by a content server that stores the content. The content server can send the content back to the user using the same path as the request. Additionally, the routers along the path between the requestor and the content server can cache the content for future requests. Accordingly, future requestors following parts of the same path will be able to retrieve the cached content and avoid transmission delays.

However, the universal caching mechanism in an ICN poses a privacy risk. In particular, the time difference between data response for cached data and uncached data can be used to infer whether a near-by user has previously requested the same content.

Accordingly, ICN technologies may benefit from techniques for protecting access privacy of cached content.

SUMMARY

The present disclosure relates generally to methods, systems, and computer readable media for providing these and other improvements to information centric network technologies.

Implementations of the present teachings relate to methods, systems, and computer-readable storage media for preventing timing determinations based on cached content in an information centric network. In some embodiments, a computing device can receive, at the computing device, a request for content from a user, where a cached version of the content is locally stored at the computing device. The computing device can initiate a time delay based on a determination that the user has not previously requested the content, and transmit the cached version of the content to the user after the time delay. In some embodiments, the time delay may be initiated based on determination that the content is determined to be sensitive content and/or is associated with a privacy mode.

In other embodiments, a computing device can receive a request for content via a port of the computing device, where a cached version of the content is locally stored at the computing device, and the port is uniquely assigned to an access point of one or more users. The computing device can initiate a time delay based on a determination that the content has not been previously requested via the port of the computing device, and transmit the cached version of the content to a user via the access point after the time delay. In some embodiments, the time delay may be initiated based on determination that the content is determined to be sensitive content and/or is associated with a privacy mode.

In further embodiments, a computing device can receive a request for content via a port of the computing device, where a cached version of the content is locally stored, relative to the computing device, the request includes an indication that the content has not been previously requested by a user associated with the request, and the port is uniquely assigned to an access point of one or more users. The computing device can initiate a time delay based on the indication that the content has not been previously requested by the user, and transmit the cached version of the content to the user via the access point after the time delay. In some embodiments, the time delay may be initiated based on determination that the content is determined to be sensitive content and/or is associated with a privacy mode.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

The following detailed description refers to the accompanying drawings. Wherever possible, the same reference numbers are used in the drawings and the following description refers to the same or similar parts. While several example embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Figure 1:
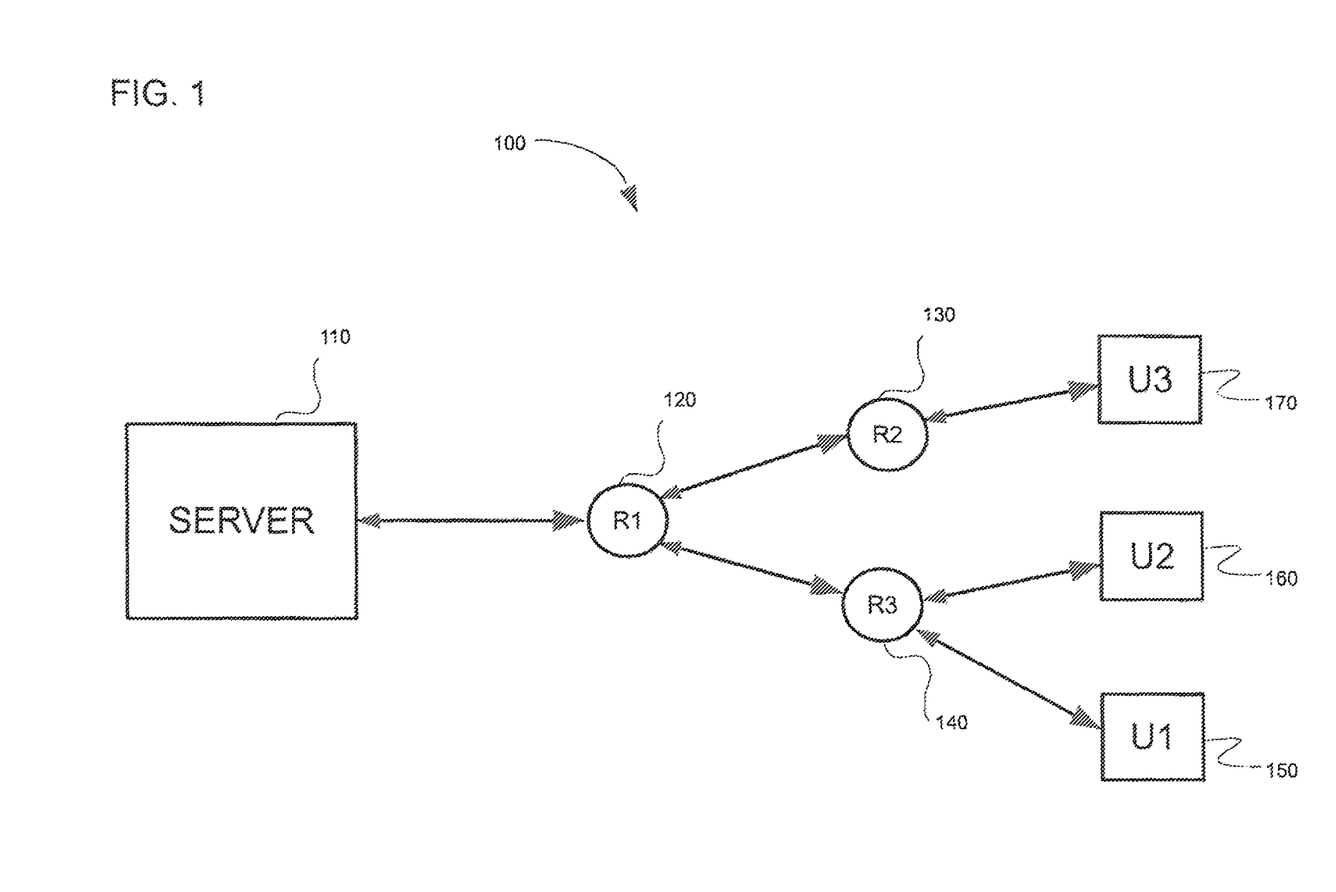
FIG. 1 is a diagram depicting a schematic of an example information centric network, consistent with certain disclosed embodiments.

FIG. 1 is a diagram depicting a schematic of an example information centric network, consistent with certain disclosed embodiments. In particular, FIG. 1 depicts an ICN 100 that includes a content server 110, routers 120 (R1), 130 (R2), and 140 (R3), and users 150 (U1), 160 (U2), and 170 (U3). Content server 110, routers 120, 130, and 140, and users 150, 160, and 170 can be referred to as nodes of ICN 100.

As used herein, an Information Centric Network (ICN) can generally refer to any type of multi-level computer network that can transfer content requests and content between levels, and where content can be cached at different levels in the network.

Additionally, as used herein, content can refer to any data and/or information that can be transmitted over a network, such as, for example, network packets, data structures, programs, computer files, etc.

Content server 110 can represent any type of one or more computing devices that can store content, receive requests for content, and transmit content to one or more routers and/or users in response to the requests. Content server 110 is depicted in ICN 100 as connected to router 120.

As used herein, depictions and reference to two nodes being connected can indicate that the two nodes are capable of communication and transmission of data via one or more direct and/or indirect connections. For example, two connected nodes can be directly connected via an Ethernet cable, can be indirectly connected via one or more routers, can be connected via a wired and/or wireless network, can be connected via the Internet, etc.

Router 120, router 130, and router 140 can represent any type of computing devices that can perform algorithms and logic for initiating time delays, as disclosed herein, can receive and forward requests for content from users, and can receive, cache, and forward content from one or more content servers and/or routers. In some embodiments, a router can be a network router, a network switch, a network hub, a network bridge, a proxy server, etc. Router 120 is depicted in ICN 100 as connected to content server 110, router 130, and router 140. Router 130 is depicted as connected to router 120 and user 170. Router 140 is depicted as connected to router 120, user 160, and user 150. In ICN 100, routers 130 and 140 can be considered "edge routers," where an edge router, relative to a user, is the primary router connected to the user that forwards the users requests, directly or indirectly, to a content server.

In some embodiments, user 150, user 160, and user 170 can represent client computing devices of users of ICN 100. In other embodiments, users 150, 160, and 170 can represent access points to ICN 100 for users. For example, each of users 150, 160, and 170 can represent the closest connecting point of one or more users to ICN 100, such as a router or any other type of connected computing device. User 150 and user 160 are depicted in ICN 100 as connected to router 140. User 170 is depicted as connected to router 130.

Accordingly, based on the principals of ICNs, requests for content from users 150, 160, and 170 are first transferred to routers 130 and 140. Routers 130 and 140 forward the requests to router 120, and router 120 forwards the requests to content server 110. Content server 110 then sends the requested content to router 120. Router 120 can cache the content and then send the content to either router 130 or router 140, depending on the source of the request. Router 130 and 140 can cache the content and then send the content to users 150, 160, and 170.

When future requests for content that has been cached are received by any of the routers, the router can respond to the request with the cached content instead of transferring the request up the chain and/or to content server 110.

For example, user 150 can request specified content by sending the request to router 140. If router 140 does not have the specified content cached, it would send the request up the chain to router 120. If router 120 does not have the specified content cached, it would send the request up the chain to content server 110. Content server 110 would respond to the request by sending the specified content to router 120. Router 120 can cache the content and send it to router 140. Router 140 can cache the content and send it to user 150.

Subsequently, user 160 can request the same specified content by sending the request to router 140. Because router 140 has the content cached it can send the specified content to user 160 without having to transfer the request up the chain.

User 170 can also request the same specified content by sending the request to router 130. Router 130 would not have received and cached the content based on user 150's request because router 130 is not between user 150 and content server 110. Accordingly, if router 130 does not otherwise have the specified content cached, it would send the request up the chain to router 120. Because router 120 has the content cached it can send the specified content to router 130 without having to transfer the request up the chain. Router 130 can cache the content and send it to user 170.

In the above example, user 160 and user 170 would typically receive the content quicker than if the content was retrieved from the content server. Additionally, by timing content requests user 160 and user 170 may be able to determine when content is cached and when content is retrieved from content server 110. Accordingly, users 160 and 170 could determine that content has been previously accessed and possibly by which users. For example, user 160 could determine that the content was cached at router 140 by determining that the time from request to receipt was only enough to hop from one node and back. If user 160 was aware that user 150 was the only other user connected to router 140 and that user 160 had not accessed the content previously, user 160 would now know that user 150 had previously accessed the content.

Accordingly, as an additional example to prevent such timing determinations, user 150 can request sensitive content by sending the request to router 140 along with an indication that the request is private. Router 140 could transfer the request and cache the sensitive content when it is received, as in the example above.

Subsequently, user 160 can request the same sensitive content by sending the request to router 140. Because router 140 has the content cached it can send the sensitive content to user 160 without having to transfer the request up the chain. However, because user 150 indicated that the request was to be private, router 140 can initiate a time delay before sending the sensitive content to user 160. If user 160 requests the sensitive content again, router 140 can send the sensitive content again, but this time without initiating the time delay. User 160 would not be able to determine if another user had requested the sensitive content based on the second request because user 160 would not know if the sensitive content was cached when another user requested it or when user 160 requested it the first time.

The example depicted in FIG. 1 is merely for the purpose of illustration, and is not intended to be limiting. For example, additional users, routers, and content servers may be used as part of an ICN. Additionally, the structure of the ICN depicted is merely a simplified example of an ICN, consistent with certain disclosed embodiments, but such an example is not intended to be limiting.

Figure 2:
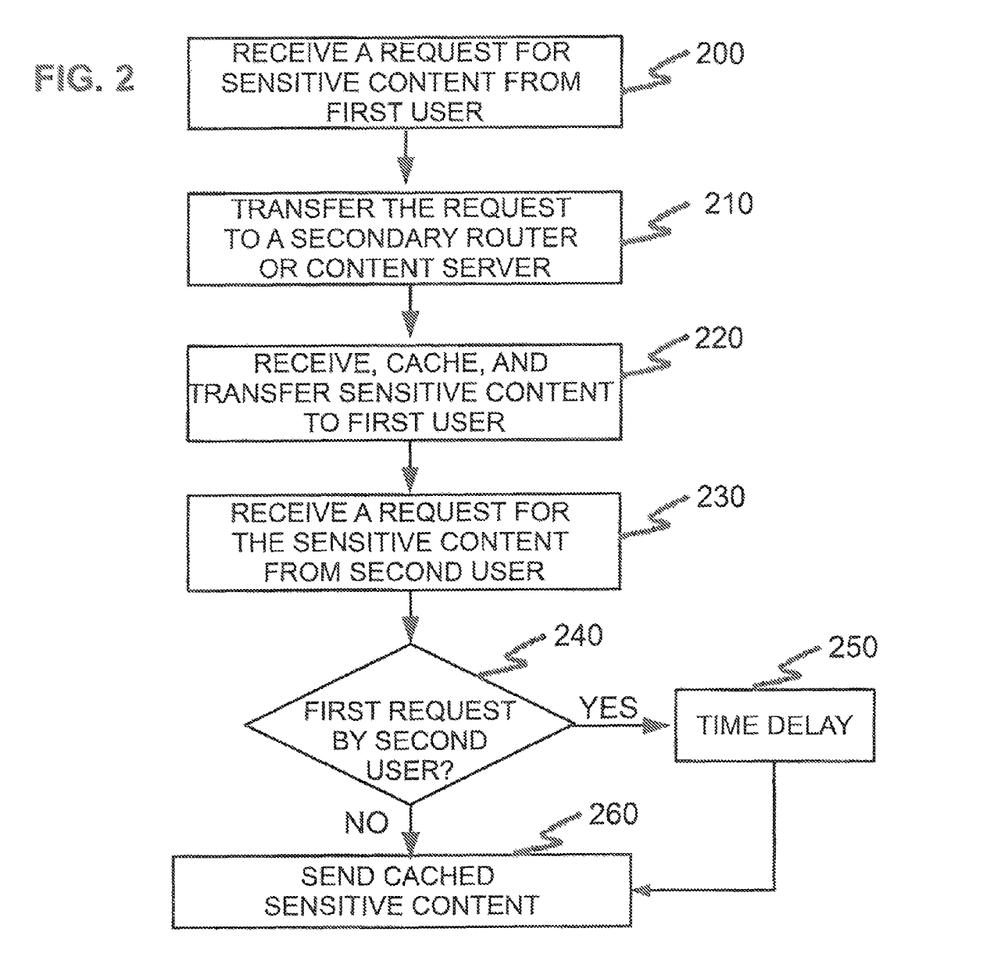
FIG. 2 is a flow diagram illustrating an example method of initiating a time delay for cached content, consistent with certain disclosed embodiments.

FIG. 2 is a flow diagram illustrating an example method of initiating a time delay for cached content, consistent with certain disclosed embodiments. The example method may be performed by a router in an ICN, such as, for example, routers 120, 130, and 140 in FIG. 1.

The process can begin in 200 when a computing device (e.g. a router in an ICN) receives a request for sensitive content from a first user. The request can be received directly from the first user or via another computing device (e.g. another router). For the description of FIG. 2, a user can refer to either a client computing device of a user or an access point of one or more users.

In some embodiments, the computing device can determine that the content is sensitive content based on an indication from the first user. For example, the request can include a privacy mode flag that the first user used to indicate that the content is sensitive and/or that privacy for the request is desired. In other embodiments, the computing device may determine that the content is sensitive content based on the content itself, such as by matching a content identifier to a list of content to be treated as sensitive, or by receiving an indication from a content server included with the content when the content is eventually received from the content server.

The computing device can store the indication that the content is sensitive content by associating, for example, the request, the content (when received), and/or a content identifier with the indication.

In some embodiments, the computing device can check its cache to determine if the content is cached. For example, the computing device can attempt to match the content identifier with identifiers of the content that is cached. If the content is not cached, in 210, the computing device can transfer the request to a content server (e.g. router 120 to content server 110 in FIG. 1) or to a secondary router up the chain towards a content server (e.g. router 140 to router 120).

If the computing device transfers the request to a secondary router, the secondary router can perform the same or similar steps as described in regard to FIG. 2. Accordingly, the secondary router can either transfer the request to a tertiary router, and so on, or to the content server.

In 220, the computing device can receive the content directly from the content server or from the content server via the secondary router. The computing device can then cache the content for future requests and can transfer the content to the first user directly or through the computing device that transferred the request.

In 230, the computing device can receive a request for the sensitive content from a second user. The request can be received directly from the second user or via another computing device (e.g. another router).

The computing device can check its cache to determine if the content is cached. For example, the computing device can attempt to match the content identifier with identifiers of the content that is cached. Because the computing device has previously cached the sensitive content, and assuming the cached sensitive content has not been previously cleared, the computing device can determined that the content is cached.

Additionally, the computing device can determine that the cached content is sensitive content by determining that the indication that the content is sensitive content is associated with, for example, the content, the content identifier, and/or the user that originally requested the content.

In 240, based on the determination that the content is sensitive, the computing device can determine if this is the first request for the sensitive content by the second user. In some embodiments, the computing device can maintain a list of users and content requested by users. For example, the users can be identified based on a user identifier, a user account identifier, an Internet Protocol (IP) address, and/or a media access control (MAC) address, and the content can be identified based on a content identifier.

In other embodiments, the computing device can maintain a list of ports and the content requested via the ports. For example, a user can be an access point of multiple users and the access point can be assigned to a unique port of the computing device. Accordingly, the computing device can determine if a request via the unique port is the first request for the sensitive content via the unique port (i.e. via the access point).

If, in 240, the computing device determines that the second user has not previously requested the sensitive content, the computing device can, in 250, initiate a time delay. For example, the computing device can compute and initiate the time delay as discussed below in the example described with regard to FIG. 3.

After the time delay, in 260, the computing device can transfer the cached sensitive content to the second user directly or through the computing device that transferred the request.

If, in 240, the computing device determines that the second user has previously requested the sensitive content, no time delay may be necessary, and the computing device can immediately transfer the cached sensitive content to the second user directly or through the computing device that transferred the request.

While the steps depicted in FIG. 2 have been described as performed in a particular order, the order described is merely example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 3:
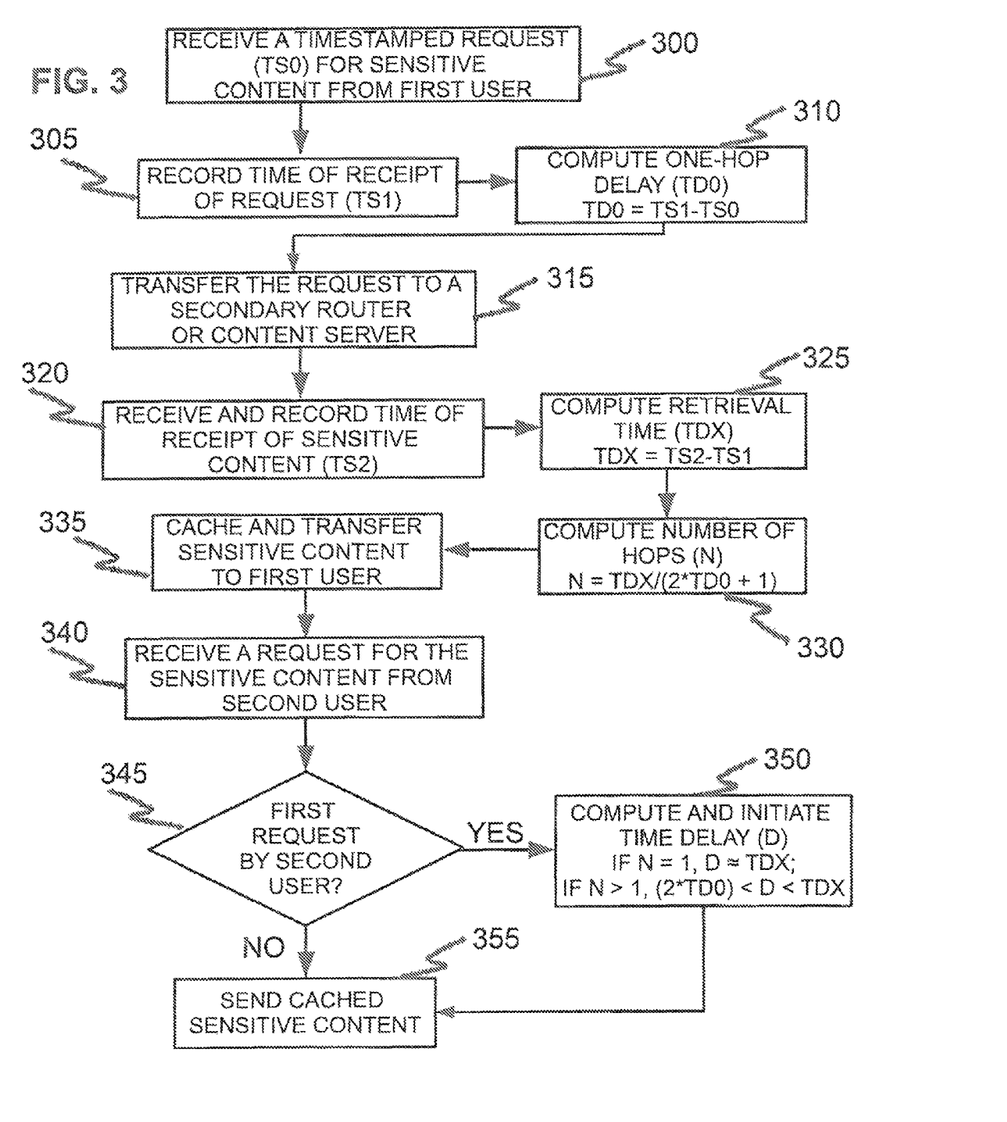
FIG. 3 is a flow diagram illustrating an example method of initiating a time delay for cached content, consistent with certain disclosed embodiments.

FIG. 3 is a flow diagram illustrating an example method of initiating a time delay for cached content, consistent with certain disclosed embodiments. The example method may be performed by a router in an ICN, such as, for example, routers 120, 130, and 140 in FIG. 1.

The process can begin in 300 when a computing device (e.g. a router in an ICN) receives a time stamped (TS0) request for sensitive content from a first user. For the description of FIG. 3, a user can refer to either a client computing device of a user or an access point of one or more users. Additionally, for the purposes of this example, the computing device can receive the request directly from the first user (i.e. one "hop" from the first user).

In some embodiments, the computing device can determine that the content is sensitive content based on an indication from the first user. For example, the request can include a privacy mode flag that the first user used to indicate that the content is sensitive and/or that privacy for the request is desired. In other embodiments, the computing device may determine that the content is sensitive content based on the content itself, such as by matching a content identifier to a list of content to be treated as sensitive, or by receiving an indication from a content server included with the content when the content is eventually received from the content server.

The computing device can store the indication that the content is sensitive content by associating, for example, the request, the content (when received), and/or a content identifier with the indication.

In some embodiments, the computing device can check its cache to determine if the content is cached. For example, the computing device can attempt to match the content identifier with identifiers of the content that is cached.

In 305, the computing device can record the time of receipt of the request (TS1). The computing device can record this time before or after determining that the content is not cached. In some embodiments, the computing device may not need to record the time of receipt if the sensitive content is already cached because the time delay (D) may have already been computed when the content was cached.

In 310, the computing device can compute the amount of time of a one-hop delay, which is the time between sending a request from a first node and receiving the request at a second, adjacent node. The computing device can subtract the timestamp of the request (TS0) from the time of receipt of the request (TS1) to compute the one-hop delay (TD0):

$$TD0 = TS1 - TS0.$$

In 315, the computing device can transfer the request to a content server or to a secondary router up the chain towards a content server (e.g. router 140 to router 120).

If the computing device transfers the request to a secondary router, the secondary router can perform similar steps as described in FIG. 3. However, the secondary router would have to account for multiple hops in determining the one-hop delay. The secondary router can either transfer the request to a tertiary router, and so on, or to the content server.

In some embodiments, the secondary router can determine the one-hop delay based on an acknowledgement received from the tertiary router that is sent by the tertiary router upon receipt of the request. The secondary router can determine the one-hop delay to be the difference between the time the request is sent to the tertiary router and the time the acknowledgement is received from the tertiary router.

In other embodiments, if the request is transferred from the secondary router directly to the content server, the secondary router can determine the one-hop delay based on when the content is received from the content server as opposed to when an acknowledgement is received.

In 320, the computing device can receive the content directly from the content server or from the content server via the secondary router and can record the time of receipt of the sensitive content (TS2).

In 325, the computing device can compute the retrieval time (TDX) for the content. The computing device can subtract the time of receipt of the request (TS1) from the time of receipt of the sensitive content (TS2) to compute the retrieval time (TDX):

$$TDX = TS2 - TS1.$$

The computing device can then compute the estimated number of hops to the content server (N) using the retrieval time (TDX) and the one-hop delay (TD0):

$$N = TDX/(2*TD0+1).$$

In some embodiments, the estimated number of hops to the content server (N) may be rounded to the nearest whole integer. In other embodiments, the estimated number of hops to the content server (N) can be truncated or, alternatively, rounded up to the nearest whole integer.

In 335, the computing device can cache the content for future requests and can transfer the content to the first user.

In 340, the computing device can receive a request for the sensitive content from a second user. For the purposes of this example, the computing device can receive the request directly from the second user (i.e. one "hop" from the second user).

The computing device can check its cache to determine if the content is cached. For example, the computing device can attempt to match the content identifier with identifiers of the content that is cached. Because the computing device has previously cached the sensitive content, and assuming the cached sensitive content has not been previously cleared, the computing device can determined that the content is cached.

Additionally, the computing device can determine that the cached content is sensitive content by determining that the indication that the content is sensitive content is associated with, for example, the content, the content identifier, and/or the user that originally requested the content.

In 345, based on the determination that the content is sensitive, the computing device can determine if this is the first request for the sensitive content by the second user.

If, in 345, the computing device determines that the second user has not previously requested the sensitive content, the computing device can, in 350, compute and initiate a time delay. If the estimated number of hops (N) to the content server is one, the time delay (D) can be, in some embodiments, zero because the retrieval time is minimal and adding unnecessary time delays can have an adverse effect on performance:

$$\text{IF } N=1, D=0.$$

In other embodiments, the time delay (D) can be set to be a time at or near the retrieval time (TDX):

$$\text{IF } N=1, D \approx TDX$$

or set to be a time between zero and the retrieval time (TDX) (e.g. randomly) to balance performance and privacy:

$$\text{IF } N=1, 0<D<TDX.$$

If the estimated number of hops (N) to the content server is greater than one the time delay (D) can be, in some embodiments, greater than two times the one-hop delay (2*TD0) but less than the retrieval time (TDX) (e.g. selected randomly between 2*TD0 and TDX):

$$\text{IF } N>1, (2*TD0)<D<TDX.$$

Two times the one-hop delay (TD0) represents the estimated retrieval time from a content server that is one hop from the computing device. Accordingly, to balance performance and privacy, the time delay will be less than the time to retrieve the content from the content server but the second user would not be able to determine that the sensitive content is cached at the computing device using a timing attack.

After the time delay, in 355, the computing device can transfer the cached sensitive content to the second user. In some embodiments, the computing device may store the computed time delay and use it for any future first requests from the same user for sensitive content that is already cached at the computing device. In other embodiments, the computing device may use the same computed time delay for other users that are one-hop from the computing device. In still further embodiments, the computing device may calculate the time delay each time a first request for sensitive content that is already cached is received.

If, in 345, the computing device determines that the second user has previously requested the sensitive content, no time delay may be necessary, and the computing device can immediately transfer the cached sensitive content to the second user directly or through the computing device that transferred the request.

While the steps depicted in FIG. 3 have been described as performed in a particular order, the order described is merely example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 4:
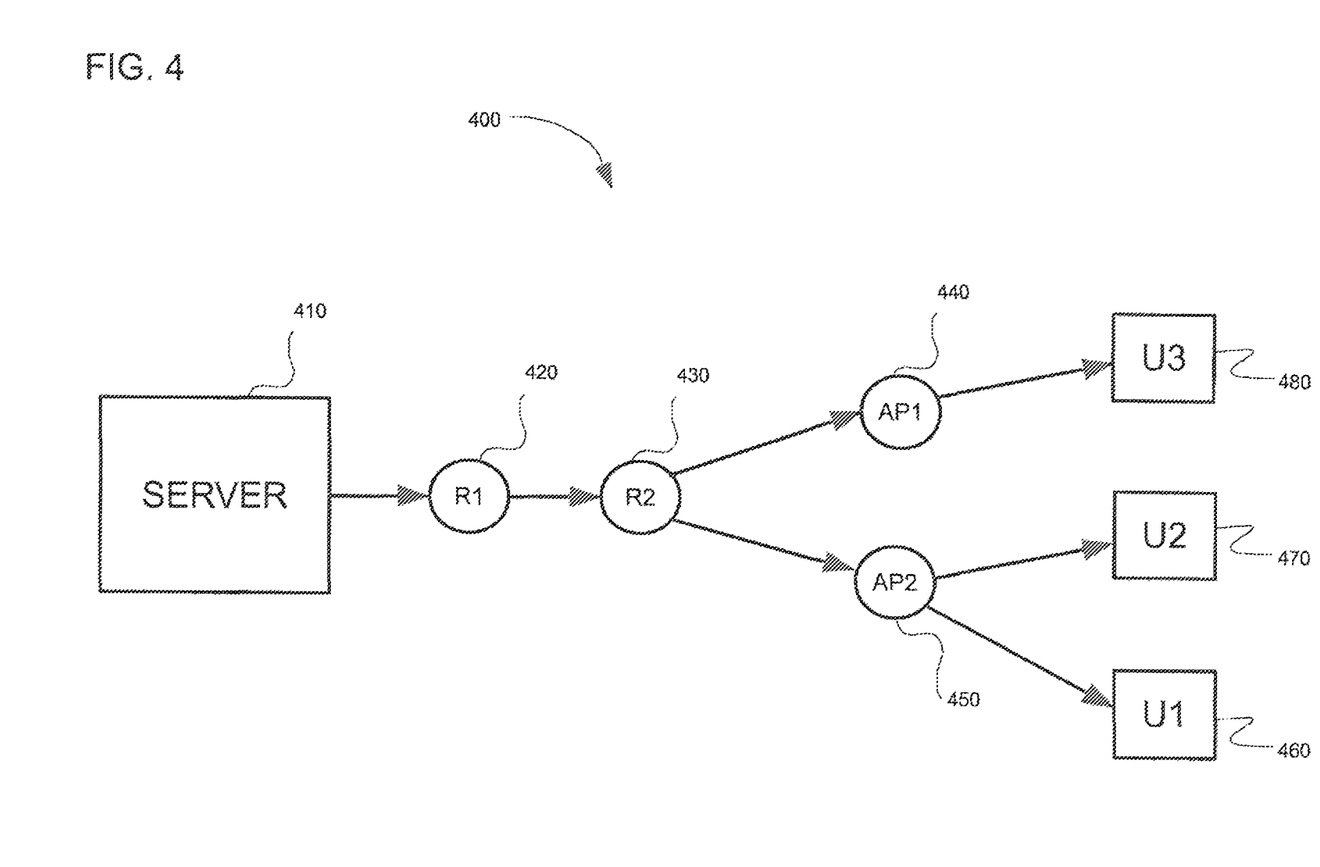
FIG. 4 is a diagram depicting a schematic of an example information centric network, consistent with certain disclosed embodiment.

FIG. 4 is a diagram depicting a schematic of an example information centric network, consistent with certain disclosed embodiments. In particular, FIG. 4 depicts an ICN 400 that includes a content server 410, routers 420 (R1) and 430 (R2), access points 440 (AP1) and 450 (AP2), and users 460 (U1), 470 (U2), and 480 (U3). Content server 410, routers 420, and 430, access points 440 and 450, and users 460, 470, and 480 can be referred to as nodes of ICN 400.

Content server 410 can represent any type of one or more computing devices that can store content, receive requests for content, and transmit content to one or more routers and/or users in response to the requests. Content server 410 is depicted in ICN 400 as connected to router 420.

Router 420 and router 430 can represent any type of computing devices that can perform algorithms and logic for initiating time delays, as disclosed herein, can receive and forward requests for content from users, and can receive, cache, and forward content from one or more content servers and/or routers. Router 420 is depicted in ICN 400 as connected to content server 410 and router 430. Router 430 is depicted as connected to router 420 and access points 440 and 450.

Access points 440 and 450 can represent any type of computing device that provides one or more users access to an ICN. For example, an access point can be a router for a local area network that includes multiple devices, an internet server provider, a wireless access point, etc. Access point 440 is depicted in ICN 400 as connected to router 430 and user 480. Access point 450 is depicted in ICN 400 as connected to router 430, user 470, and user 460. Access points 440 and 450, as depicted in ICN 400, can represent the closest access points to ICN 400 for users 460, 470, and 480.

In some embodiments, user 460, user 470, and user 480 can represent client computing devices of users of ICN 400. User 460 and user 470 are depicted in ICN 400 as connected to access point 450. User 480 is depicted as connected to access point 440.

Accordingly, based on the principals of ICNs, requests for content from users 460, 470, and 480 are first transferred to access points 440 and 450. Access points 440 and 450 forward the requests to router 430, which forwards requests to router 420, and router 420 forwards the requests to content server 410. Content server 410 then sends the requested content to router 420. Router 420 can cache the content and then send the content to router 430. Router 430 can cache the content and send the content to either access point 440 or access point 450, depending on the source of the request.

When future requests for content that has been cached are receive by any of the routers, the router can respond to the request with the cached content instead of transferring the request up the chain and/or to content server 410.

In ICN 400, access points 440 and 450 can perform algorithms and logic to assist the routers in preventing timing determinations on sensitive content.

As an example to prevent such timing determinations, user 460 can request sensitive content by sending the request through access point 450 to router 430 along with an indication that the request is private. Router 430 could transfer the request and cache the sensitive content when it is received.

Subsequently, user 470 can request the same sensitive content by sending the request through access point 450 to router 430. Access point 450 can determined that user 470 has not previously accessed the sensitive content and flag the request as being a first time request from a user before transferring the request to router 430. Because router 430 has the content cached it can send the sensitive content to user 470 without having to transfer the request up the chain. However, because user 460 indicated that the request was to be private and the request was flagged as a first time request by access point 450, router 430 can initiate a time delay before sending the sensitive content to user 470. If user 470 requests the sensitive content again, router 430 can send the sensitive content again, but this time access point 450 would not flag the request and the sensitive content would be sent without initiating the time delay. User 470 would not be able to determine if another user had requested the sensitive content based on the second request because user 470 would not know if the sensitive content was cached when another user requested it or when user 470 requested it the first time. Additionally, router 430 would not have to maintain a list of which users accessed which content, but can use the flags created by the access points.

In some embodiments, routers can maintain a list of which access points have transferred requests for specific content and initiate time delays if the request is a first request via an access point for cached content even if the request is not flagged.

The example depicted in FIG. 4 is merely for the purpose of illustration, and is not intended to be limiting. For example, additional users, access points, routers, and content servers may be used as part of an ICN. Additionally, the structure of the ICN depicted is merely a simplified example of an ICN, consistent with certain disclosed embodiments, but such an example is not intended to be limiting.

Figure 5:
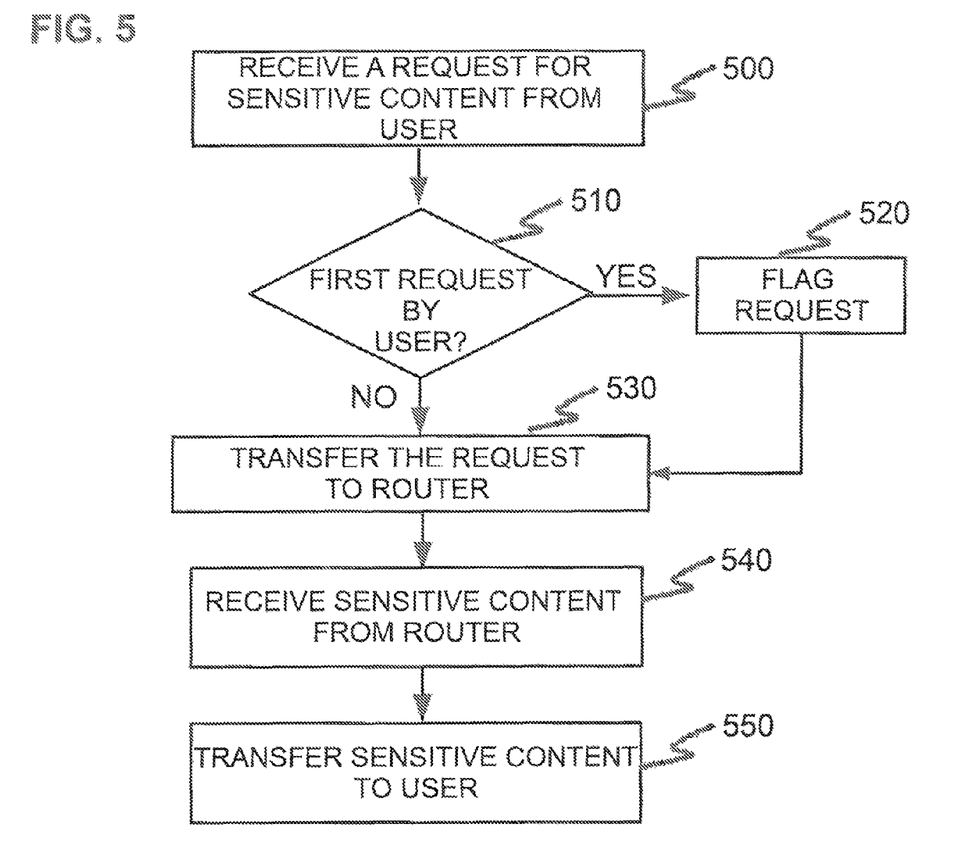
FIG. 5 is a flow diagram illustrating an example method of flagging requests for sensitive content, consistent with certain disclosed embodiments.

FIG. 5 is a flow diagram illustrating an example method of flagging requests for sensitive content, consistent with certain disclosed embodiments. The example method may be performed by an access point to an ICN, such as, for example, access points 440 and 450 as described in regard to FIG. 4.

The process can begin in 500 when a computing device (e.g. an access point in an ICN) receives a request for sensitive content from a user. The request can be received directly from the user or via another computing device (e.g. another router).

In some embodiments, the computing device can determine that the content is sensitive content based on an indication from the first user. For example, the request can include a privacy mode flag that the first user used to indicate that the content is sensitive and/or that privacy for the request is desired. In other embodiments, the computing device may determine that the content is sensitive content based on the content itself, such as by matching a content identifier to a list of content to be treated as sensitive, or by receiving an indication from a content server included with the content when the content is eventually received from the content server. In further embodiments, the computing device may not determine whether the content is sensitive and may flag all first-time requests for content from a particular user.

The computing device may store the indication that the content is sensitive content by associating, for example, the request, the content (when received), and/or a content identifier with the indication.

In 510, the computing device can determine if this is the first request for the sensitive content by the user. In some embodiments, the computing device can maintain a list of users and content requested by users. For example, the users can be identified based on a user identifier, a user account identifier, an Internet Protocol (IP) address, and/or a media access control (MAC) address, and the content can be identified based on a content identifier.

If, in 510, the computing device determines that the user has not previously requested the sensitive content, the computing device can, in 520, flag the request. In some embodiments, the commuting device may only flag the request if the computing device determines that the requested content is sensitive.

If, in 510, the computing device determines that the user has previously requested the sensitive content, the content may not be flagged.

In 530, the computing device can transfer the flagged or not flagged request to a router in the ICN. In 540, the computing device can receive the sensitive content from the router in response to the request. In 550, the computing device can transfer the sensitive content to the user.

While the steps depicted in FIG. 5 have been described as performed in a particular order, the order described is merely example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 6:
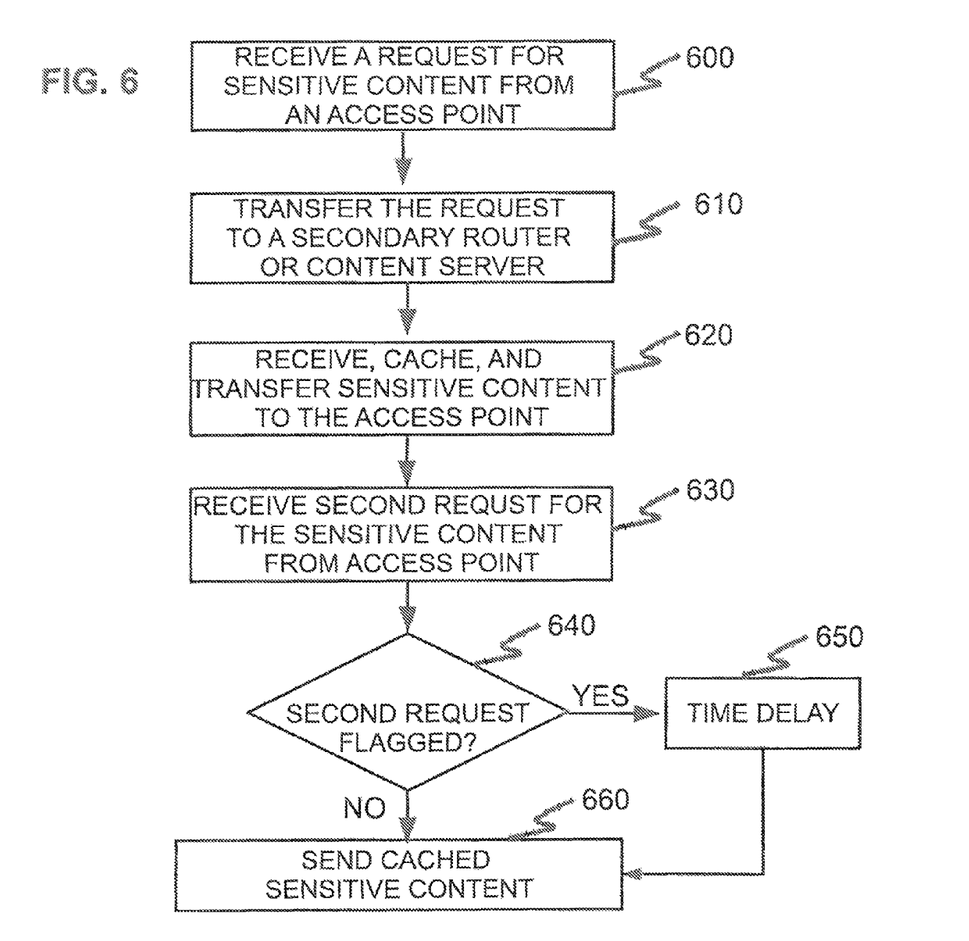
FIG. 6 is a flow diagram illustrating an example method of initiating a time delay for cached content, consistent with certain disclosed embodiments.

FIG. 6 is a flow diagram illustrating an example method of initiating a time delay for cached content, consistent with certain disclosed embodiments. The example method may be performed by a router in an ICN, such as, for example, routers 420 and 430 in FIG. 4, where the ICN includes one or more access points that perform the steps described in regard to FIG. 5.

The process can begin in 600 when a computing device (e.g. a computer device in an ICN) receives a request for sensitive content via an access point. The access point (e.g. another router) can be an access point to the ICN for multiple users, and the request may have originated from one of the users.

In some embodiments, the computing device can determine that the content is sensitive content based on an indication from the user and/or the access point. For example, the request can include a privacy mode flag that the user used to indicate that the content is sensitive and/or that privacy for the request is desired. In other embodiments, the computing device may determine that the content is sensitive content based on the content itself, such as by matching a content identifier to a list of content to be treated as sensitive, or by receiving an indication from a content server included with the content when the content is eventually received from the content server.

The computing device can store the indication that the content is sensitive content by associating, for example, the request, the content (when received), and/or a content identifier with the indication.

In some embodiments, the computing device can check its cache to determine if the content is cached. For example, the computing device can attempt to match the content identifier with identifiers of the content that is cached. If the content is not cached, in 610, the computing device can transfer the request to a content server (e.g. router 420 to content server 410 in FIG. 4) or to a secondary router up the chain towards a content server (e.g. router 430 to router 420).

If the computing device transfers the request to a secondary router, the secondary router can perform the same or similar steps as described in regard to FIG. 6. Accordingly, the secondary router can either transfer the request to a tertiary router, and so on, or to the content server.

In 620, the computing device can receive the content directly from the content server or from the content server via the secondary router. The computing device can then cache the content for future requests and can transfer the content to the access point.

In 630, the computing device can receive a second request for the sensitive content from the access point. The request may have originated from a different user than the first request.

The computing device can check its cache to determine if the content is cached. For example, the computing device can attempt to match the content identifier with identifiers of the content that is cached. Because the computing device has previously cached the sensitive content, and assuming the cached sensitive content has not been previously cleared, the computing device can determined that the content is cached.

Additionally, the computing device may determine that the cached content is sensitive content by determining that the indication that the content is sensitive content is associated with, for example, the content, the content identifier, and/or the user that originally requested the content.

In 640, the computing device can determine if the request has been flagged by the access point. In some embodiments, the computing device may only determine if the request has been flagged, while, in other embodiments, the computing device may also determine if the request is a first request received from that particular access point. Accordingly, in some embodiments, the computing device can maintain a list of access points and content requested via the access points. For example, the access points can be identified based on an access point identifier, an Internet Protocol (IP) address, and/or a media access control (MAC) address, and the content can be identified based on a content identifier.

If, in 640, the computing device determines that the content is flagged, the computing device can, in 650, initiate a time delay. For example, the computing device can compute and initiate the time delay as discussed in the example described with regard to FIG. 3.

After the time delay, in 660, the computing device can transfer the cached sensitive content to the access point.

If, in 640, the computing device determines that the content is not flagged, in some embodiments, no time delay may be necessary, and the computing device can immediately transfer the cached sensitive content to the access point. In further embodiments, the computing device may only immediately transfer the cached sensitive content if the request is not a first request received from that particular access point.

While the steps depicted in FIG. 6 have been described as performed in a particular order, the order described is merely example, and various different sequences of steps can be performed, consistent with certain disclosed embodiments. Additionally, the steps are described as discrete steps merely for the purpose of explanation, and, in some embodiments, multiple steps may be performed simultaneously and/or as part of a single computation. Further, the steps described are not intended to be exhaustive or absolute, and various steps can be inserted or removed.

Figure 7:
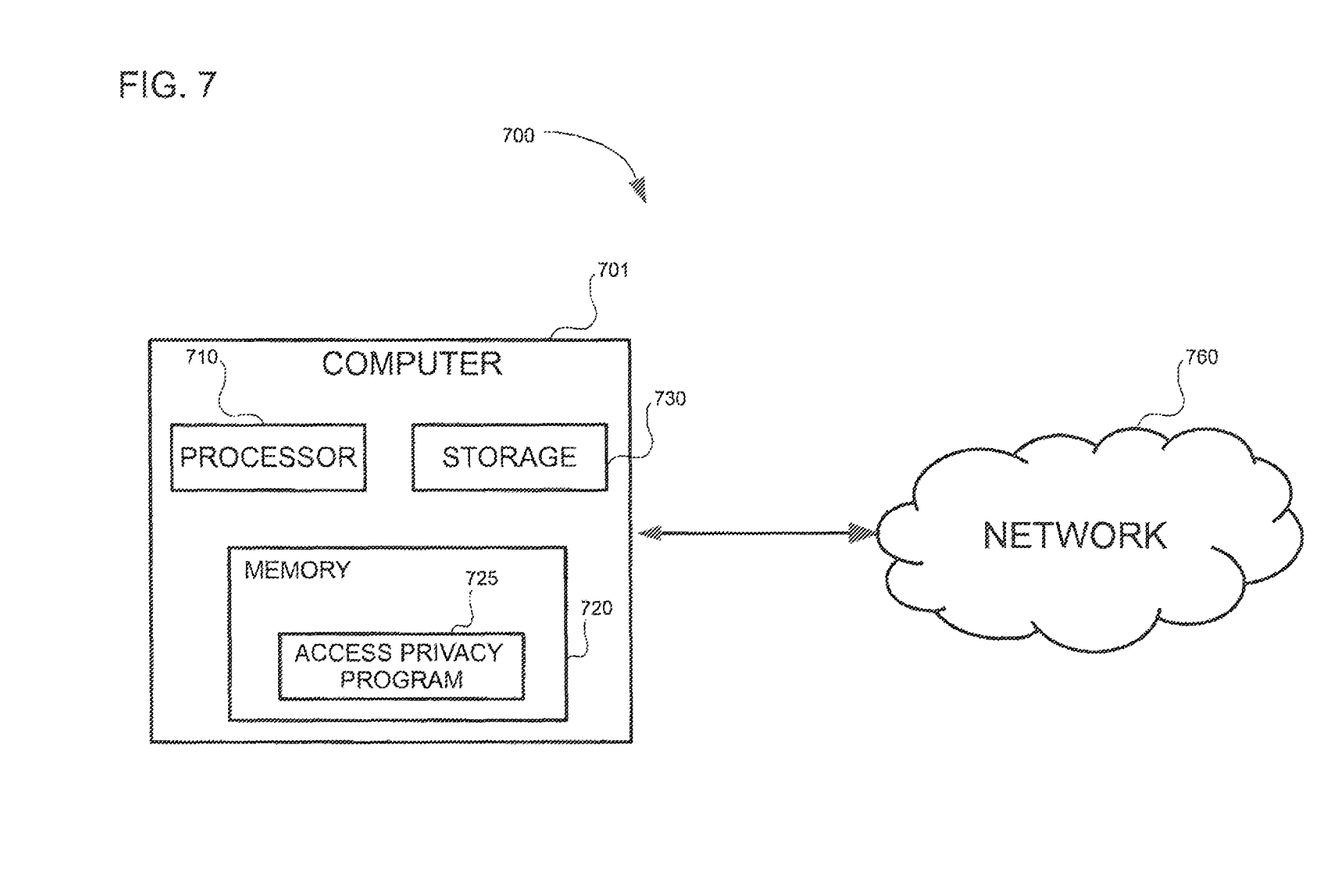
FIG. 7 is a diagram illustrating an example hardware system for protecting access privacy of cached content, consistent with certain disclosed embodiments.

FIG. 7 is a diagram illustrating an example hardware system for protecting access privacy of cached content, consistent with certain disclosed embodiments. The example system 700 includes example system components that may be used. The components and arrangement, however, may be varied.

A computer 701 may include a processor 710, a memory 720, storage 730, and input/output (I/O) devices (not pictured). The computer 701 may be implemented in various ways and can be configured to perform any of the embodiments described above. For example, the computer 701 may be a general purpose computer, a router, an edge router, an access point, a content server, an origin server, a mainframe computer, any combination of these components, or any other appropriate computing device. The computer 701 may be standalone, or may be part of a subsystem, which may, in turn, be part of a larger system.

The processor 710 may include one or more known processing devices, such as a microprocessor from the Intel Core™ family manufactured by Intel™, the Phenom™ family manufactured by AMD™, or any of various processors manufactured by Sun Microsystems. Memory 720 may include one or more storage devices configured to store information used by processor 710 to perform certain functions related to disclosed embodiments. Storage 730 may include a volatile or non-volatile, magnetic, semiconductor, tape, optical, removable, non-removable, or other type of computer-readable medium used as a storage device.

In one embodiment, memory 720 may include one or more programs or subprograms that may be loaded from storage 730 or elsewhere that, when executed by computer 701, perform various procedures, operations, or processes consistent with disclosed embodiments. For example, memory 720 may include an access privacy program 725 for protecting access privacy of cached contents according to disclosed embodiments. Memory 720 may also include other programs that perform other functions and processes, such as programs that provide communication support, Internet access, etc. The access privacy program 725 may be embodied as a single program, or alternatively, may include multiple sub-programs that, when executed, operate together to perform the function of the access privacy program 725 according to disclosed embodiments.

The computer 701 may communicate over a link with a network 760. For example, the link may be a direct communication link, a LAN, a WAN, or other suitable connection. The network 760 may include the internet, as well as other systems. For example, in embodiments, the network can be part of an ICN.

The computer 701 may include one or more I/O devices (not pictured) that allow data to be received and/or transmitted by the computer 701. I/O devices may also include one or more digital and/or analog communication input/output devices that allow the computer 701 to communicate with other machines and devices. I/O devices may also include input devices such as a keyboard or a mouse, and may include output devices such as a display or a printer. The computer 701 may receive data from external machines and devices and output data to external machines and devices via I/O devices. The configuration and number of input and/or output devices incorporated in I/O devices may vary as appropriate for various embodiments.

In embodiments, the computer 701 may also be communicatively connected to one or more data repositories.

Example uses of the system 700 can be described by way of example with reference to the example embodiments described above.

Example uses of the time delaying methods described above can be utilized in any type of communication network, including ICNs, or computer system in which privacy of cached data is desired and timing determinations are a potential threat.

While the teachings has been described with reference to the example embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer-implemented method, comprising:
   receiving, at a device, a request for content from a first user device, wherein a cached version of the content is locally stored at the device;
   initiating, by a processor, a time delay based on a determination that the first user device has not previously requested the content; and
   transmitting the cached version of the content to the first user device after the time delay.

2. The computer-implemented method of claim 1, further comprising determining, at the device, that the first user device has not previously requested the content.

3. The computer-implemented method of claim 1, wherein:
   a second device determines that the first user device has not previously requested the content; and
   the request for the content is received via the second device with an indication that the first user device has not previously requested the content.

4. The computer-implemented method of claim 1, wherein:
   the first user device is an access point for a plurality of user devices;
   communication from the access point is assigned to a port of the device;
   the port is uniquely assigned to the access point; and
   the determination that the first user device has not previously requested the content is based on a determination that the content has not been previously requested via the port of the device.

5. The computer-implemented method of claim 1, further comprising determining that the content is associated with a privacy mode.

6. The computer-implemented method of claim 1, wherein the device is part of an information centric network.

7. The computer-implemented method of claim 1, wherein the device is an edge router relative to an access point of the first user device.

8. The computer-implemented method of claim 1, further comprising:
receiving an initial request for the content from a second user device at the device before the content is locally cached at the device, wherein the initial request is associated with a privacy mode;
transmitting the initial request for the content to a second device;
receiving the content from the second device;
storing the cached version of the content; and
transmitting the content to the second user device.

9. The computer-implemented method of claim 8, further comprising generating the time delay based on an expected number of nodes between the device and an original source of the content.

10. The computer-implemented method of claim 9, further comprising:
calculating a request time delay based on a first timestamp associated with a time that the request was sent by the first user device and a second timestamp associated with a time that the request was received at the device;
calculating a retrieval time delay based on a measured time between when the initial request was transmitted to the second device and when the content was received from the second device; and
determining the expected number of nodes between the device and the original source of the content based on the request time delay and the retrieval time delay.

11. The computer-implemented method of claim 1, further comprising generating the time delay randomly within a predetermined range.

12. A system comprising:
a processing system of a device comprising one or more processors; and
a memory system comprising one or more computer-readable media, wherein the one or more computer-readable media contain instructions that, when executed by the processing system, cause the processing system to perform operations comprising
receiving, at the device, a request for content from a first user device, wherein a cached version of the content is locally stored at the device;
initiating a time delay based on a determination that the first user device has not previously requested the content; and
transmitting the cached version of the content to the first user device after the time delay.

13. The system of claim 12, the operations further comprising determining, at the device, that the first user device has not previously requested the content.

14. The system of claim 12, wherein:
a second device determines that the first user device has not previously requested the content; and
the request for the content is received via the second device with an indication that the first user device has not previously requested the content.

15. The system of claim 12, wherein:
the first user device is an access point for a plurality of user devices;
communication from the access point is assigned to a port of the device;
the port is uniquely assigned to the access point; and
the determination that the first user device has not previously requested the content is based on a determination that the content has not been previously requested via the port of the device.

16. The system of claim 12, the operations further comprising determining that the content is associated with a privacy mode.

17. The system of claim 12, wherein the device is part of an information centric network.

18. The system of claim 12, wherein the device is an edge router relative to an access point of the first user device.

19. The system of claim 12, the operations further comprising:
receiving an initial request for the content from a second user device at the device before the content is locally cached at the device, wherein the initial request is associated with a privacy mode;
transmitting the initial request for the content to a second device;
receiving the content from the second device;
storing the cached version of the content; and
transmitting the content to the second user device.

20. The system of claim 19, the operations further comprising:
calculating a request time delay based on a first timestamp associated with a time that the request was sent by the first user device and a second timestamp associated with a time that the request was received at the device;
calculating a retrieval time delay based on a measured time between when the initial request was transmitted to the second device and when the content was received from the second device;
determining an expected number of nodes between the device and an original source of the content based on the request time delay and the retrieval time delay; and
generating the time delay based on the expected number of nodes.

* * * * *